A. LANCE.
VEHICLE WHEEL.
APPLICATION FILED OCT. 9, 1916.
1,285,251.
Patented Nov. 19, 1918.
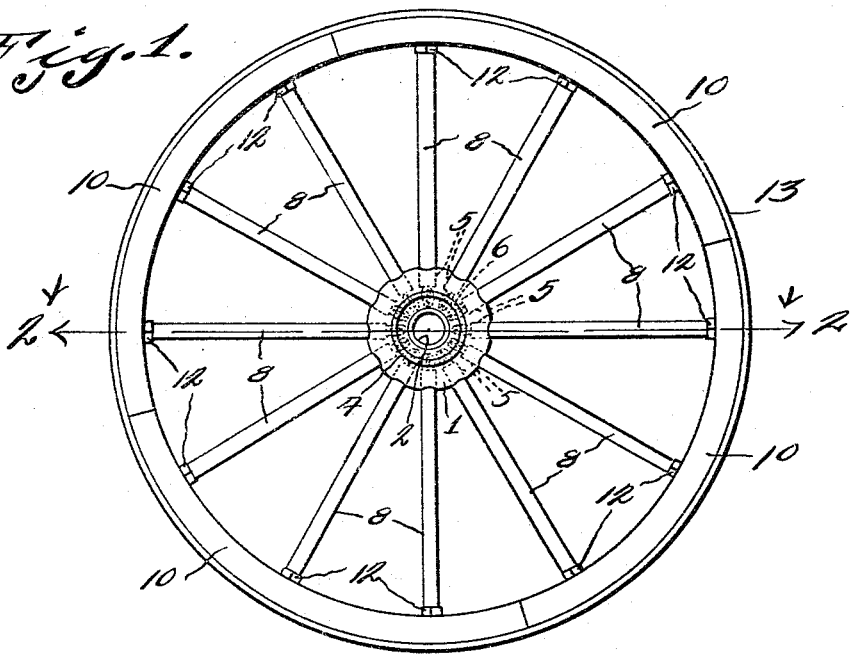
Fig. 1.
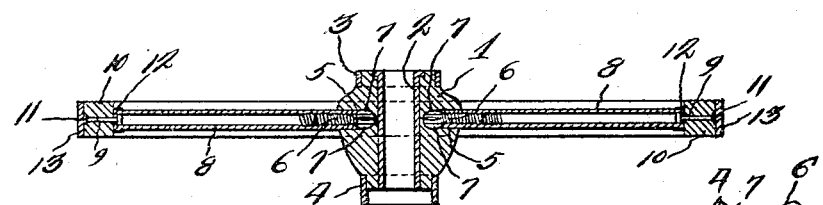
Fig. 2.
Fig. 3.
Fig. 4.
Inventor
A. Lance
Witnesses
Philip Ferrell
Frances G. Boswell
By D. Swift & Co.
Attorneys

UNITED STATES PATENT OFFICE.

ARTHUR LANCE, OF DARLINGTON, SOUTH CAROLINA.

VEHICLE-WHEEL.

1,285,251.  Specification of Letters Patent.  Patented Nov. 19, 1918.

Application filed October 9, 1916. Serial No. 124,527.

*To all whom it may concern:*

Be it known that I, ARTHUR LANCE, a citizen of the United States, residing at Darlington, in the county of Darlington, State of South Carolina, have invented a new and useful Vehicle-Wheel; and I do hereby declare the following to be a full, clear, and exact description of the invention, such as will enable others skilled in the art to which it appertains to make and use the same.

This invention relates to an improved vehicle wheel, and means for tightening the spokes and the rim thereof, and an object of the invention is to provide a device of this kind, in which improved, efficient and practical features of construction are involved.

In practical fields, the details of construction may necessitate alterations falling within the scope of what is claimed.

The invention comprises further features and combination of parts, as hereinafter set forth, shown in the drawings, and claimed.

In the drawings:—

Figure 1 is a view in side elevation of the improved wheel constructed in accordance with the invention.

Fig. 2 is a sectional view on line 2—2 of Fig. 1.

Fig. 3 is a detail view of one of the screw plugs that are anchored in the hub of the wheel.

Fig. 4 is a sectional view on line 4—4 of Fig. 3.

Referring more especially to the drawings, 1 designates a hub having the usual bushing or sleeve 2, and the strengthening rings or bands 3 and 4, one upon each end of the hub. The hub 1 at intervals thereabout is provided with a plurality of borings or cylindrical recesses 5, and 6 denotes a plurality of screws. One end of each screw is provided with radial wings or flanges 7, which, in cross section, extend at right angles to each other. The inner portions of the borings or cylindrical recesses 5 are smaller in diameter than their outer portions. When arranging the screws in the borings or recesses 5, the ends having the wings or flanges are driven into said borings or recesses, until the wings or flanges engage or embed into the smaller ends of the borings or recesses, to prevent the screws from turning. After anchoring the screws in place in this manner, the tubular spokes 8 are threaded to the screws, as shown, the inner ends of the spokes partially entering the borings or recesses 5, that is, their outer portions. The outer ends of the tubular spokes are closed, except where the shanks of the bolts 9 extend through said ends, whereby the heads of the bolts engage the inner surface of the ends of the spokes. The rim of the wheel is constructed in sections 10, as shown in Fig. 1, and the shanks of the bolts 9 are passed through the sections 10 of the rim, after which the outer ends of the bolts are riveted, as shown at 11. The outer portions of the spokes at their outer ends are provided with rectangular parts 12, to be engaged by a wrench, not shown, whereby the spokes may be turned. After fastening the spokes to the three sections, each section is arranged, so that its respective spokes are in position to receive the threaded screws 6. The spokes are then turned until their inner ends enter the borings or recesses 5 of the wheel hub sufficiently to cause the ends of the sections 10 to substantially abut. The tire 13, while in a heated condition, is then applied to the rim of the wheel, after which the tubular spokes may be adjusted outwardly to not only tighten the spokes, but also the rim.

The invention having been set forth, what is claimed as new and useful, is:

The combination with a wooden hub member having a plurality of radial borings or cylindrical recesses, the inner end of each of which is smaller in diameter than the outer end, of a plurality of screws to engage the inner ends of said borings or recesses, the inner ends of said screws having radial wings to cut or bite into the walls of said inner ends of the borings to anchor and prevent the screws from turning, a plurality of tubular spokes threaded to said screws and fitting telescopically into the outer ends of the borings of said wooden hub, a multiple sectional wheel rim, means for swiveling the outer ends of the tubular spokes to the rim and means carried by the outer ends of said tubular spokes to be engaged by a device for adjusting the spokes, whereby they may be tightened.

In testimony whereof I have signed my name to this specification in the presence of two subscribing witnesses.

ARTHUR LANCE.

Witnesses:
J. H. CORTEZ,
DWIGHT HARRINGTON.